L. C. VANDERLIP.
STEERING WHEEL LOCK.
APPLICATION FILED APR. 9, 1920.
1,359,921.
Patented Nov. 23, 1920.
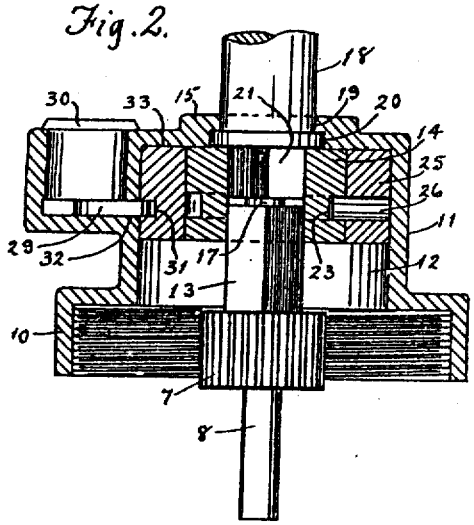
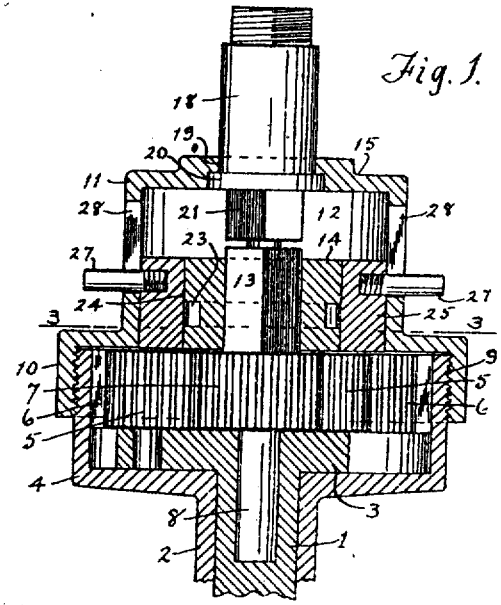
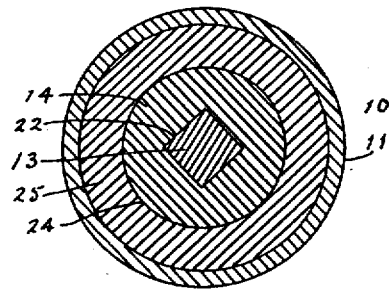
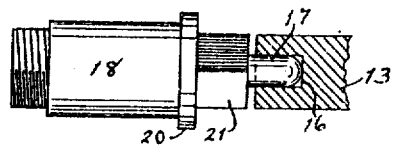
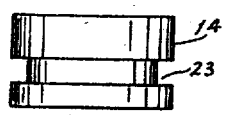
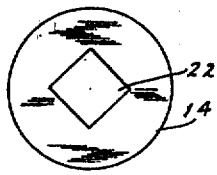
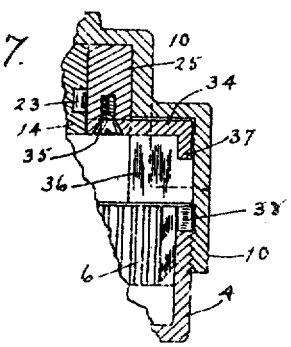
INVENTOR.
Louis C. Vanderlip

UNITED STATES PATENT OFFICE.

LOUIS C. VANDERLIP, OF ELKHART, INDIANA

STEERING-WHEEL LOCK.

1,359,921.  Specification of Letters Patent.  Patented Nov. 23, 1920.

Application filed April 9, 1920. Serial No. 372,577.

*To all whom it may concern:*

Be it known that I, LOUIS C. VANDERLIP, a citizen of the United States, residing in the city of Elkhart, county of Elkhart, Indiana, have invented certain new and useful Improvements in Steering-Wheel Locks, of which the following is a specification.

This invention relates to locking devices to prevent theft or unauthorized use or operation of automobiles, and especially to means for locking the steering wheel thereof in either operative or inoperative position.

An object of my invention is the production of a steering wheel locking device which is applicable to motor cars of the Ford type in which planetary gearing is used in the steering head.

Another object of the invention is the production of a device of the character described in which the center or driving pinion of the planetary gear remains in constant mesh, and in which a movable clutch is incorporated for operatively connecting or disconnecting the steering wheel and steering gear.

A third object is the production of a steering wheel locking device which is readily applicable to cars now in use. Still another object of the invention is the production of a device of the character described in which a shifting clutch is used to connect or disconnect the steering wheel with the driving pinion of the planetary gearing, in which the driving pinion of the planetary gearing remains in constant mesh therewith and in which the endwise shift of the steering wheel itself is eliminated. Other objects of my invention are mentioned and described herein.

The preferred embodiment of my invention is illustrated in the accompanying drawing in which Figure 1 is a vertical sectional view of the invention showing the clutch member uncoupled; Fig. 2 is a vertical sectional view through the top casing member including the wheel shaft, the drive pinion and shaft, and the clutch, the latter being in the coupling position; Fig. 3 is a section taken on the line 3—3 of Fig. 1; Fig. 4 is a side view of the clutch member; Fig. 5 is a top plan view of the same member; Fig. 6 is a view showing the connection between the wheel shaft and the pinion stub shaft for maintaining the axial relation between them; and Fig. 7 is a fragment in section showing the means for locking the top casing against removal from the lower casing.

Similar numerals of reference indicate like members throughout the several views on the drawing.

Referring to the drawing in detail the numeral 1 indicates the top end of a steering post of a Ford motor car, said post being rotatively mounted within the usual tubular steering column 2 and provided with the head 3 which is arranged within the cylindrical housing or lower casing 4 which is carried by the steering column. Numerals 5, 5 indicate the usual gears of the planetary gearing mounted upon the post head 3 in the usual, or any suitable, manner, which gears mesh with the annular rack 6 formed on the inner periphery of the casing 4.

The numeral 7 indicates the center or drive pinion of the planetary which meshes with all of the pinions 5, 5, and which is carried by a stub shaft 8 journaled in the top end of the post 1. The outer periphery of the housing 4 is screw threaded at 9 to carry the threaded top casing member 10, the latter of which may have the extension 11 which is provided with the cylindrical chamber 12. The numeral 13 indicates a squared or polygonal stub shaft rigid with the upper periphery of the pinion 7, projecting upward therefrom into the chamber 12, and disposed axially of the pinion shaft 8, said stub shaft being adapted to carry the sliding clutch member 14, as hereinafter described.

The top end of the stub shaft 13 may terminate intermediate the top and bottom of the chamber 12 and may be provided with an axially formed bore 16 in the end thereof in which bore the cylindrical reduced lower end 17 of the shaft 18 is journaled, said shaft 18 projecting to the exterior of the casing 10 through the bearing aperture 19 to enable the mounting of the usual steering wheel—not shown—thereon, as is well known in the art. The wheel shaft 18 may have a rigid collar or annular flange 20 engaging the under side of the top wall 15 of the chamber 12 to prevent upward lengthwise movement of said shaft, and it may be provided also with a squared or polygonal clutch shaft portion 21 which corresponds in formation with the polygonal stub shaft 13 and which is arranged within the chamber 12 with its lower end disposed adjacent the top end of the shaft 13. The numeral 14 indicates a cylindrical sliding clutch member provided with a polygonal bore 22 corresponding in size and shape with the shafts 13 and 21, said clutch being carried wholly on the shaft 13, when inoperative, and is adapted to be upwardly moved on said shaft 13 into engagement with the wheel shaft portion 21, as shown in Fig. 2, for coupling the two shafts together, such being the operative or driving position of the clutch, whereby the steering post 1 is operatively connected with the wheel shaft 18. The numeral 23 indicates an endless circumferential groove formed in the outer periphery of the clutch 14, said clutch being rotatively arranged within the bore 24 of the clutch lifter collar 25 and maintained therein against longitudinal displacement by a pin 26 which is radially disposed in said collar and projects into the groove 23. The clutch collar 25 is slidably arranged within the chamber 12 and may be provided with a plurality of handles or lifter pins 27, 27 rigidly connected therewith by screw threads, or otherwise in any suitable manner, said handles projecting through vertical slots 28, 28, formed in the casing extension 11, to the casing exterior, which handles are adapted to enable manual actuation of the clutch collar 25, and thereby actuation of the clutch 14, for alternately coupling and uncoupling the stub shaft 13 and the wheel shaft 18.

In Fig. 2 of the drawing the members 18 and 13 are operatively coupled together by the clutch 14, in which position they may be releasably locked by a swinging arm 29 carried by the tumbler lock 30, which lock is suitably mounted in the casing 10, the point of said arm engaging in a slot 31 formed in the outer periphery of the collar 25, said arm being operative through an aperture 32 formed in the wall of the chamber 12.

When the members 25 and 14 are lowered to the position shown in Fig. 1, which may readily be done by disengaging the arm 29 from the collar slot 31, said arm may then be swung into engagement with the upper face 33 of said clutch lifter collar, thereby forming an abutment thereto, and whereby upward movement of the clutch 14 cannot be effected by an unauthorized person, or one having no key to the lock 30.

In devices of this character it is important that the upper casing 10 be locked against removal from the lower casing 4 upon which it is screwed. In Fig. 7 of the drawing I show a casing locking device wherein the numeral 34 indicates an arm projecting laterally from the clutch collar 25, to which it may be rigidly fastened by a screw 35. The locking arm 34 may project laterally into a casing chamber 36 formed in member 10 and in which it is adapted to move upward and downward as the collar 25 is actuated, as heretofore described, said arm being provided with a depending prong 37 which is adapted to engage in a recess 38 formed in the peripheral edge of the lower casing 4 when the collar 25 is lowered to the position indicated in Fig. 1 of the drawing. In Fig. 7 the arm 34 is elevated with the collar 25 and the prong 37 is disengaged from the recess 38, but as this is the driving position of the clutch 14 it is not important that said prong is thus disengaged from the recess 38, for the car owner is then supposed to be in control of the steering mechanism which could be operated as well by an unauthorized person if found in that condition without attempting to or the necessity of unscrewing the top casing 11.

But when the car owner desires to lock it against use by unauthorized persons he drops the clutch 14 to the position indicated in Fig. 1 of the drawing and locks it by the arm 29 of the lock 30, whereby the casing locking arm prong 37 is automatically engaged in the recess 38, whereby rotation of the casing top 10 is effectually prevented.

I claim:

1. In a steering device for vehicles, a steering wheel shaft; a steering post; driven gears for actuating the steering post; a drive gear in constant mesh with the driven gears; a stub shaft carried by said drive gear and arranged axially of said wheel shaft; movable coupling means mounted to move longitudinally with respect to the axis of said post and independently of said shafts, said coupling means being adapted to alternately couple and uncouple said wheel and stub shafts, whereby, when said shafts are coupled together, rotation of said wheel shaft will effect rotation of said steering post, and whereby, when said shafts are uncoupled, rotation of said wheel shaft will not effect rotation of said steering post; and means for releasably locking said coupling means in an uncoupled position.

2. In a steering device for vehicles, a steering wheel shaft; a steering post; driven gears for actuating the steering post; a drive gear in constant mesh with the driven gears; a stub shaft carried by said drive gear and arranged axially of said wheel shaft; movable coupling means mounted to move longitudinally with respect to the axis of said post and independently of said shafts, said coupling means being adapted to alternately couple and uncouple said wheel and stub shafts, whereby, when said shafts are coupled together, rotation of said wheel shaft will effect rotation of said steering post, and whereby, when said shafts are uncoupled, rotation of said wheel shaft will not effect rotation of said steering post; means for actuating said coupling means; and means for releasably locking said coupling means in an uncoupled position.

3. In a steering device for vehicles, a steering wheel shaft; a steering post; driven gears for actuating the steering post; a drive gear in constant mesh with the driven gears; a stub shaft carried by said drive gear and arranged axially of said wheel shaft; a movable coupler member carried by one of said shafts and adapted to move longitudinally with respect to the axis of said post and independently of said shaft, said coupler member being adapted to alternately couple and uncouple said wheel and stub shafts, whereby, when said shafts are coupled together, rotation of said wheel shaft will effect rotation of said steering post, and whereby, when said shafts are uncoupled, rotation of said wheel shaft will not effect rotation of said steering post; means connected with said coupler member for the actuation thereof, and means for releasably locking said coupler member in an uncoupled position.

4. In a steering device for vehicles, a steering wheel shaft; a steering post; a casing; driven gears within the casing for actuating the steering post; a drive gear in constant mesh with the driven gears; a stub shaft carried by said drive gear and arranged axially of said wheel shaft; movable coupling means within the casing and mounted to move longitudinally with respect to the axis of said post and independently of said shafts, said coupling means being adapted to alternately couple and uncouple said wheel and stub shafts, whereby, when said shafts are coupled together, rotation of said wheel shaft will effect rotation of said steering post, and whereby, when said shafts are uncoupled, rotation of said wheel shaft will not effect rotation of said steering post; means arranged within said casing for actuating said coupling means; means connected with said last mentioned means and accessible from the exterior of the casing for the actuation thereof, and means for releasably locking said coupling means.

5. In a steering device for vehicles, a steering wheel shaft; a steering post; a casing; driven gears within the casing for actuating the steering post; a drive gear in constant mesh with the driven gears; coupling means carried by said drive gear; movable coupling means mounted to move longitudinally with respect to the axis of said post and independently of said wheel shaft and said drive gear, said coupling means being adapted to alternately couple and uncouple said wheel shaft and said drive gear, whereby when said shaft and gear are coupled together, rotation of said wheel shaft will effect rotation of said steering post, and whereby, when said shaft and gear are uncoupled, rotation of said shaft will not effect rotation of said steering post; means for actuating said coupling means; and means for releasably locking said coupling means in an uncoupled position.

6. In a steering device for vehicles, a steering wheel shaft; a steering post; a casing; driven gears within the casing for actuating the steering post; a drive gear in constant mesh with the driven gears; coupling means carried by said drive gear; movable coupling means mounted to move longitudinally with respect to the axis of said post and independently of said wheel shaft and said drive gear, said coupling means being adapted to alternately couple and uncouple said wheel shaft and said drive gear, whereby when said shaft and drive gear are coupled together, rotation of said wheel shaft will effect rotation of said steering post, and whereby, when said wheel shaft and drive gear are uncoupled, rotation of said wheel shaft will not effect rotation of said steering post; means movable with said coupling means for actuating the latter; means connecting said coupling means with its actuating means to enable independent rotation of said coupling means; and means for releasably locking said coupling means.

7. In a steering device for vehicles, a steering wheel shaft; a steering post; driven gears for actuating the steering post; a drive gear in constant mesh with the driven gears; coupling means carried by said drive gear; movable manually operative coupling means mounted to move longitudinally with respect to the axis of said post and independently of said wheel shaft and said drive gear, said coupling means being adapted to alternately couple and uncouple said wheel shaft and drive gear, whereby, when said shaft and drive gear are coupled together, rotation of said shaft will effect rotation of said steering post, and whereby, when said shaft and drive gear are uncoupled, rotation of said wheel shaft will not effect rotation of said steering post; and means for releasably locking said coupling means in an uncoupled position.

8. In a steering device for vehicles, a steering wheel shaft; a steering post; driven gears for actuating the steering post; a drive gear in constant mesh with the driven gears; a stub shaft carried by the drive gear and arranged axially of the wheel shaft; a coupler member slidably mounted upon one of said shafts and adapted to alternately couple and uncouple said wheel and stub shafts; a collar encompassing said coupler member and within which said coupler is rotatively carried, said collar being movably mounted; means for actuating said collar and thereby said coupler member; and means for releasably locking said coupler member.

9. In a steering device for vehicles, a steering wheel shaft; a steering post; driven gears for actuating the steering post; a drive gear in constant mesh with the driven gears; a stub shaft carried by the drive gear and arranged axially of said wheel shaft; a coupler member slidably mounted on said stub shaft and adapted to alternately couple and uncouple said wheel and stub shafts, whereby, when said shafts are coupled together, rotation of said wheel shaft will effect rotation of said steering post, and whereby, when said shafts are uncoupled, rotation of said wheel shaft will not effect rotation of said steering post; and means for releasably locking said coupling member upon said stub shaft.

10. In a steering device for vehicles, a casing; a steering wheel shaft; a steering post; driven gears for actuating the steering post; a drive gear in constant mesh with the driven gears; a stub shaft carried by the drive gear and arranged axially of said wheel shaft; a coupler member slidably mounted upon said stub shaft and adapted to alternately couple and uncouple said wheel and stub shafts; a collar encompassing said coupler member and within which said coupler is rotatively carried, said collar being slidably mounted within said casing; means for actuating said collar and thereby said coupler member, whereby, when said wheel and stub shafts are coupled together, rotation of said wheel shaft will effect rotation of said steering post, and whereby, when said shafts are uncoupled, rotation of said wheel shaft will not effect rotation of said steering post; and means for releasably locking said coupler member in coupled or uncoupled relation with said wheel shaft.

11. In a steering device for vehicles, a shaft operatively connected with the steering gear; a casing; a steering wheel shaft disposed axially of said first mentioned shaft; means for preventing endwise movement of said wheel shaft relative to the other shaft; a coupler member within said casing and in constant actuating relation with one of said shafts, said coupler member having a sliding connection with said shaft; a coupler actuating member encompassing said coupler member; a complementary pin and groove connection between said coupler and said actuating member; means for actuating said coupler actuating member; and means for releasably locking said coupler member.

12. In a steering device for vehicles, a shaft operatively connected with the steering gear; a casing; a steering wheel shaft disposed axially of said first mentioned shaft; means for preventing endwise movement of said wheel shaft relative to the other shaft; coupling means operatively connected with said first mentioned shaft; a coupler member within said casing and in constant actuating relation with one of said shafts and adapted to coöperate with the coupling means connected with said first mentioned shaft to alternately couple and uncouple said shafts; a coupler lifting member encompassing said coupler and operatively connected therewith to enable rotation of said coupler within said lifting member and to longitudinally move said coupler on its shaft when said lifting member is actuated; an opening in said casing; a handle connected with said lifting member and projecting into said casing opening to enable manual operation of said lifting member and thereby said coupler member; and means for releasably locking said coupler member.

13. In a steering device for vehicles, a shaft operatively connected with the steering gear; a casing provided with a removable cap; a steering wheel shaft disposed axially of said first mentioned shaft; means for preventing endwise movement of said wheel shaft relative to the other shaft; a coupler member within said casing and in constant actuating relation with one of said shafts, said coupler member having a sliding connection with said shaft; means movable with said coupler member for shifting the latter longitudinally of said shaft, whereby said shafts may be alternately coupled and uncoupled; and means movable with said coupler shifting means for releasably locking said casing cap to said casing.

In testimony whereof I have hereunto affixed my signature this 7th day of April, 1920.

LOUIS C. VANDERLIP.